United States Patent
Trabelsi et al.

(10) Patent No.: US 10,771,503 B2
(45) Date of Patent: Sep. 8, 2020

(54) DISSUADING STOLEN PASSWORD REUSE

(71) Applicant: SAP SE, Walldorf (DE)

(72) Inventors: Slim Trabelsi, Biot (FR); Karim Oueslati, Antibes (FR); Skander Ben Mahmoud, Antibes (FR)

(73) Assignee: SAP SE, Walldorf (DE)

( * ) Notice: Subject to any disclaimer, the term of this patent is extended or adjusted under 35 U.S.C. 154(b) by 308 days.

(21) Appl. No.: 15/863,092

(22) Filed: Jan. 5, 2018

(65) Prior Publication Data
US 2019/0215337 A1 Jul. 11, 2019

(51) Int. Cl.
*H04L 29/06* (2006.01)
*G06F 21/55* (2013.01)

(52) U.S. Cl.
CPC ........ *H04L 63/1491* (2013.01); *G06F 21/554* (2013.01); *H04L 63/083* (2013.01); *H04L 63/126* (2013.01); *H04L 63/1425* (2013.01)

(58) Field of Classification Search
CPC .............. H04L 63/1491; H04L 63/083; H04L 63/1425; H04L 63/126; H04L 63/101; H04L 63/0236; H04L 63/0884; H04L 63/63; H04L 63/08; G06F 21/554
See application file for complete search history.

(56) References Cited

U.S. PATENT DOCUMENTS

| | | | | |
|---|---|---|---|---|
| 2007/0044155 A1* | 2/2007 | Pletka | ..................... | H04L 63/08 726/25 |
| 2010/0050268 A1* | 2/2010 | Sheymov | ................ | G06F 21/31 726/27 |
| 2011/0141276 A1* | 6/2011 | Borghei | ................ | H04W 12/08 348/143 |
| 2013/0173741 A1* | 7/2013 | Pfeffer | ..................... | G06F 15/16 709/216 |
| 2013/0212658 A1* | 8/2013 | Amaya Calvo | ..... | H04L 63/1441 726/6 |
| 2013/0263226 A1* | 10/2013 | Sudia | ................... | H04L 63/1466 726/4 |
| 2013/0276078 A1* | 10/2013 | Rockwell | ................ | G06F 21/43 726/7 |
| 2017/0111391 A1* | 4/2017 | Chao | .................... | H04L 63/1491 |
| 2017/0178148 A1* | 6/2017 | Ryan | .................... | H04L 63/1491 |
| 2017/0195346 A1 | 7/2017 | Be'Ery et al. | | |

FOREIGN PATENT DOCUMENTS

WO 02/098100 A1 12/2002
WO 2008/103778 A2 8/2008

* cited by examiner

*Primary Examiner* — Chau Le
*Assistant Examiner* — Han Yang
(74) *Attorney, Agent, or Firm* — Jones Day

(57) ABSTRACT

A user authentication process is initiated by a software application executing on a primary server. The user authentication process prompts a user to enter, via a graphical user interface, login credentials. Thereafter, it is determined that the login credentials have been flagged. The user is then directed from the primary server to a fake server (i.e., a second server) mimicking the software application executing on the primary server. Thereafter, the fake server obtains metadata associated with the user interacting with the fake server that characterizes the user. This obtained metadata can later be provided (e.g., displayed, loaded into memory, stored in physical persistence, transmitted to a remote computing system, etc.). Related apparatus, systems, techniques and articles are also described.

20 Claims, 4 Drawing Sheets

DISSUADING STOLEN PASSWORD REUSE

TECHNICAL FIELD

The subject matter described herein relates to techniques for dissuading the reuse of stolen passwords for accessing software systems.

BACKGROUND

Cyberattacks in which a website, web application or a domain is hacked are increasing in frequency. The goal of most such attacks is to obtain company confidential data which is sold in the Dark Web and/or publicly published in various web accessible networks such as text storage sites. This company confidential data often includes user information including username login credentials (username/password combinations).

Once these login credentials become available, people (malicious or curious) may try to illegally exploit these credentials by accessing these hacked accounts. These accounts can remain accessible until their owners will change their passwords. While countermeasures can be taken such as forced password change processes, user accounts remain vulnerable prior to such countermeasures being implemented.

SUMMARY

In a first aspect, a user authentication process is initiated by a software application executing on a primary server. The user authentication process prompts a user to enter, via a graphical user interface, login credentials. Thereafter, it is determined that the login credentials have been flagged. The user is then directed from the primary server to a fake server (i.e., a second server) mimicking the software application executing on the primary server. Thereafter, the fake server obtains metadata associated with the user interacting with the fake server that characterizes the user. This obtained metadata can later be provided (e.g., displayed, loaded into memory, stored in physical persistence, transmitted to a remote computing system, etc.).

In some cases, the provision of data can include generating an alert using the obtained metadata that characterizes the user and causing the alert to be displayed in the graphical user interface.

An Internet Protocol (IP) address for the user can be identified so that such IP address can be blacklisted from subsequent access to the software system.

In some variations, an account password recovery process can be initiated requiring multi-factor authentication. As part of such a process, the user can be prompted, in the graphical user interface, to provide an e-mail address and/or phone number required for the multi-factor authentication and such the provided e-mail address and/or phone number can form part of the obtained metadata. The provided e-mail address and/or phone number can be used to deliver a warning message to the user indicating to the user that its activities are unauthorized.

The obtained metadata can include at least one of: an IP address, a browser fingerprint, a VPN provider and address, an Internet Service Provider, or an IP address geolocation. The browser fingerprint can characterize at least one of a user agent, a list of installed plugins, a language, a screen size of a computing device, time zone of the computing device, and/or an operating system being executed on the computing device.

Tracking cookies can be injected on a computing device used by the user which can generate information that can be used to create a virtual profile of the user.

Further, an IP address of a computing device used by the user can be scanned to detect open ports. These open ports can then be used to detect applications running on the device.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
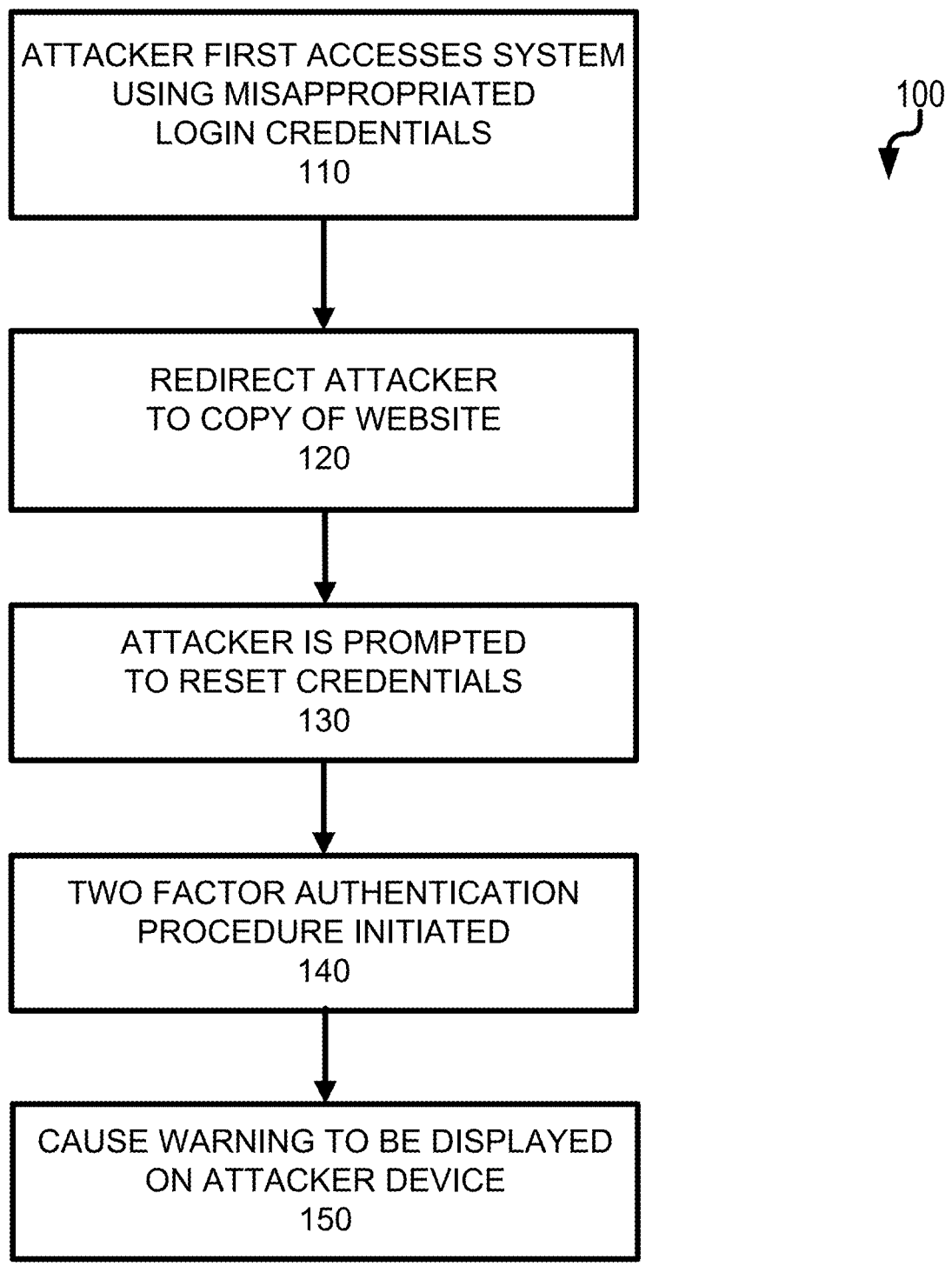
FIG. 1 is a first process flow diagram illustrating a method for dissuading reuse of stolen login credentials.

The current subject matter provides solutions to help hacked domains trap unauthorized users attempting to obtain access to and subsequently use stolen login credentials. In particular, the current subject matter is advantageous in that it deters malicious actors from attempting to login domains using stolen passwords from going any further and test more stolen passwords. The current subject matter provides processes to collect data and metadata that characterizes the attacker which can be used for a variety of purposes including sending him or her a threatening warning message.

With the current subject matter, when a website or a domain is hacked, the administrator can be notified by the hack internally (by analyzing logs of the system) or externally via specific services that monitor all the account leakage and notify when a domain is concerned. The hacked website will then put in place a forced password change process to all their users by notifying them and asking to change their password (ideally using two factor authentication). Once this step done, the administrator will observe the account updates from the user. If they detect a login tentative using the old stolen credential for an account that was already secured, the attacker will be redirected to a separate clone version of the domain that contains fake data. The user will then be asked start an account 'recovery' process (that appears legitimate to the attacker).

During this process, the attacker will be asked to provide information to recover the blocked user account such as: email address, second recovery email address, phone number and a new password. The attacked will be then asked to confirm all this information by sending a verification email, an SMS code or a phone call. At the same time, all the attacker's navigation metadata will be collected: IP address, browser fingerprint (e.g., user agent, list of installed plugins, language, time zone, screen size, and/or operating system etc.), VPN provider and address if used, Internet Service Provider, IP address geolocation. Such information can be collected using tools and libraries (like fingerprintjs2) that are installed on the servers.

In some variations, tracking cookies can be injected into the computing device used by the attacker. If the attacker's browser is configured to accept cookies, there is a possibility of monitor the different tentative of reusing passwords using the same attacking machine. This cookie can be updated every time an attacker's browser is trying to access illegally an account using stolen credentials. Based on information obtained by such tracking cookies, a virtual profile of the attacker can be generated that includes the list of password trials per website, the trials timestamp and the origin of the stolen password. The virtual profile can be used to do show to the attacker that his hacking activity is tracked and notify him about the severity of his infraction.

Further, in some variations, the IP address of the computing device used by the attacker can be scanned to detect open ports. Based on this information, running applications on such IP address can be detected.

At the end of this attackers' data collection process, the system will display and send by e-mail a warning message to the attacker showing all his data and explaining that he is in a law infringement that could lead him to court judgement.

With reference to diagram 100 of FIG. 1, initially, at 110, when an attacker tries a stolen credential in order to access an account that was already secured by his owner, that system will not display an error message. Thereafter, at 120, the attacker is then redirected to a copy of the website (that is isolated from the productive system) by giving the impression to the attacker that he is in the right website. Next, at 130, the system will ask, for security reasons, the attacker to reset the credentials of the account. The attacker will fill a form asking for a set of personal contact data (e-mail, postal address, phone number, etc.). Further, at 140, to validate the account credentials, the attacker is invited to confirm his information by clinking on a link contained in the e-mail confirmation and by sending a code via SMS to his phone. At the same time all of the user's navigation metadata is collected (IP address, OS, browser, language, etc.). Once the attacker information is confirmed, at 150, a warning message can be made to appear to the attacker explaining that he or she is currently in violation of applicable laws and his or her personal information collected as part of the authentication process will be used against him or her during judicial proceedings. For example, if an e-mail or phone number has been provided, a message can be sent one of those modalities. Finally based on the collected navigation metadata, the system, at 160, can blacklist and block definitively the machine of the attacker.

Figure 2:
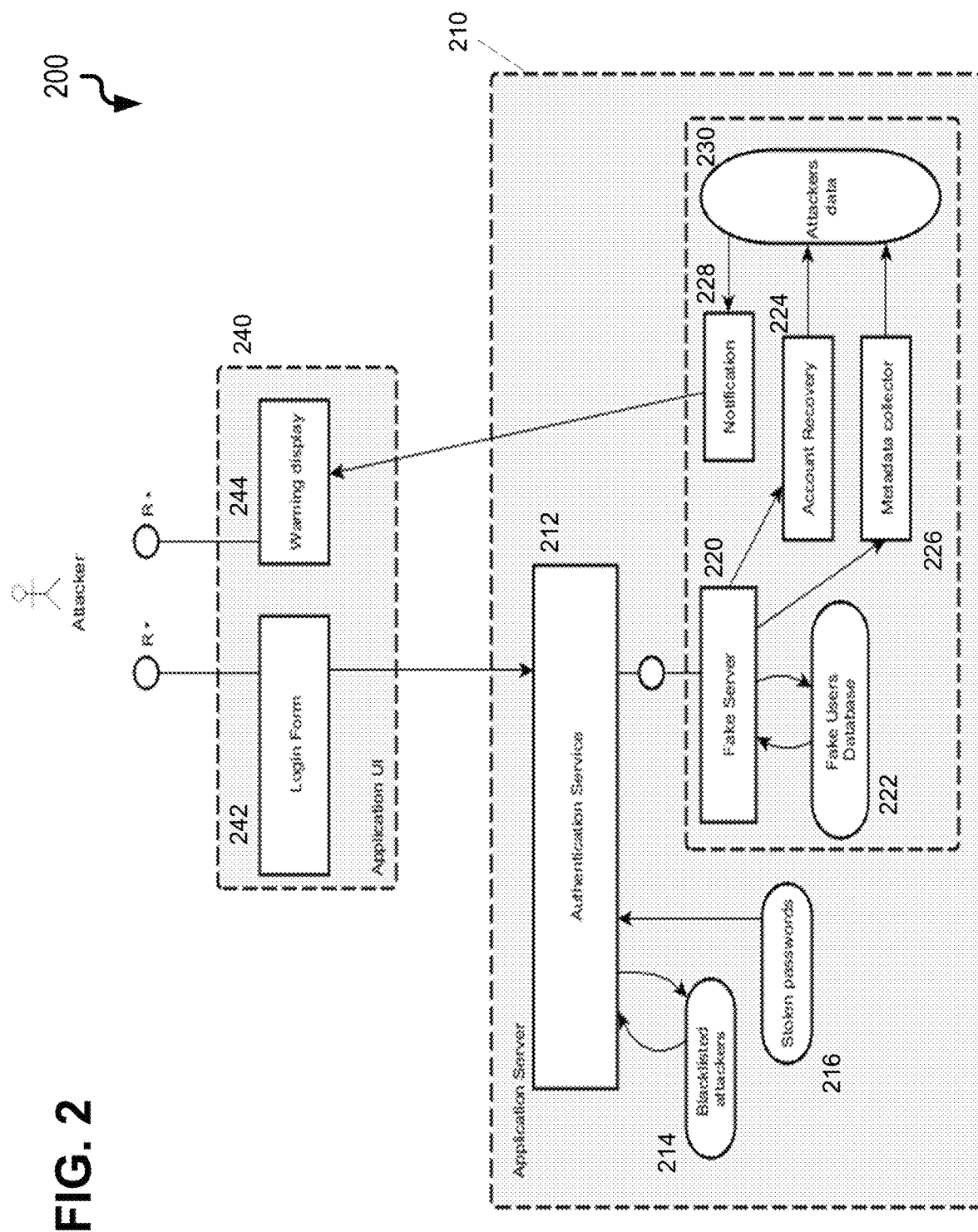
FIG. 2 is a schematic diagram illustrating a system for dissuading reuse of stolen login credentials.

FIG. 2 is an architecture diagram 200 illustrating an application server 210 accessed by an client application layer (UI) 240 (executing on a remote computing device). The client application layer (UI) 240 can form part of a web client, a native application and/or a mobile application. A login form 242 can be a graphical user interface that takes, as an input, the user's credentials to login to a software system executing on the application server 210. A warning display 244 can be a UI form that displays a warning message to the attacker after attempting an illegal login (i.e., a login using stolen credentials).

The application server layer 210 is a layer that contains a database and services. An authentication service 212 is a component that can verify the login credentials provided via the login form 242 and which can create a user session. During the authentication process, the authentication service 212 can decide to login the user to the real server or redirect the attacker to the fake system if it detects a login tentative with the stolen passwords. A database can store information characterizing blacklisted attackers 214 such as profiles of attackers that have previously attempted to access the software system using stolen credentials. The database can also store a list of stolen passwords 216 for use by the authentication service 212 to detect illegal login attempts.

A user using stolen credentials can be redirected to a fake server 220 that contains false/fake user data in a fake user database 222. The fake server 220 can include an application server that is a clone of the productive application server 210 but which contains false/fake user data. An account recovery component 224 can start the recovery process; it will ask the attacker to provide verified information and a new password. A metadata collector 226 can be a component that collects the attacker's metadata. A notification component 228 can be used to compile the data send a warning message to the attacker. Fake user data can be stored in a database that contains faker user data to legitimatize the fake server 220. Attackers data 230 can be a database that contains data and metadata of the attacker collected by the metadata collector 226 and the account recovery component 224.

Figure 3:
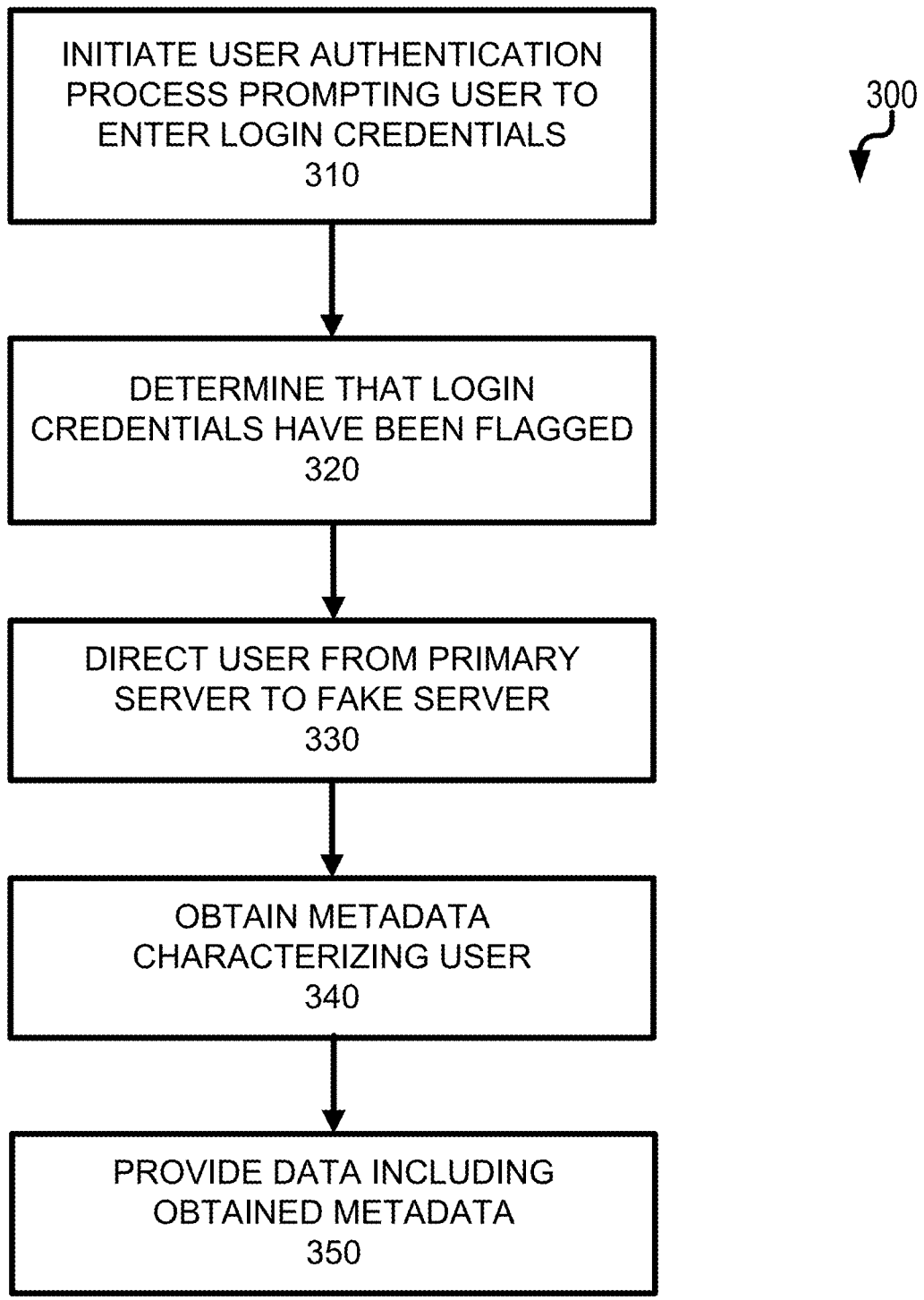
FIG. 3 is a second process flow diagram illustrating a method for dissuading reuse of stolen login credentials.

FIG. 3 is a diagram 300 in which, at 310, a user authentication process is initiated by a software application executing on a primary server. The user authentication process prompts a user to enter, via a graphical user interface, login credentials. It is subsequently determined, at 320, that the login credentials have been flagged. As a result, at 330, the user is directed from the primary server to a fake server mimicking the software application executing on the primary server. The fake server, at 340, then obtains metadata associated with the user authentication process executing on the fake server that characterizes the user. Data is then provided, at 350, that includes the obtained metadata. For example, an alert can displayed in the graphical user interface that characterizes the user and warns him or her that their access of the software system was unauthorized.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 4:
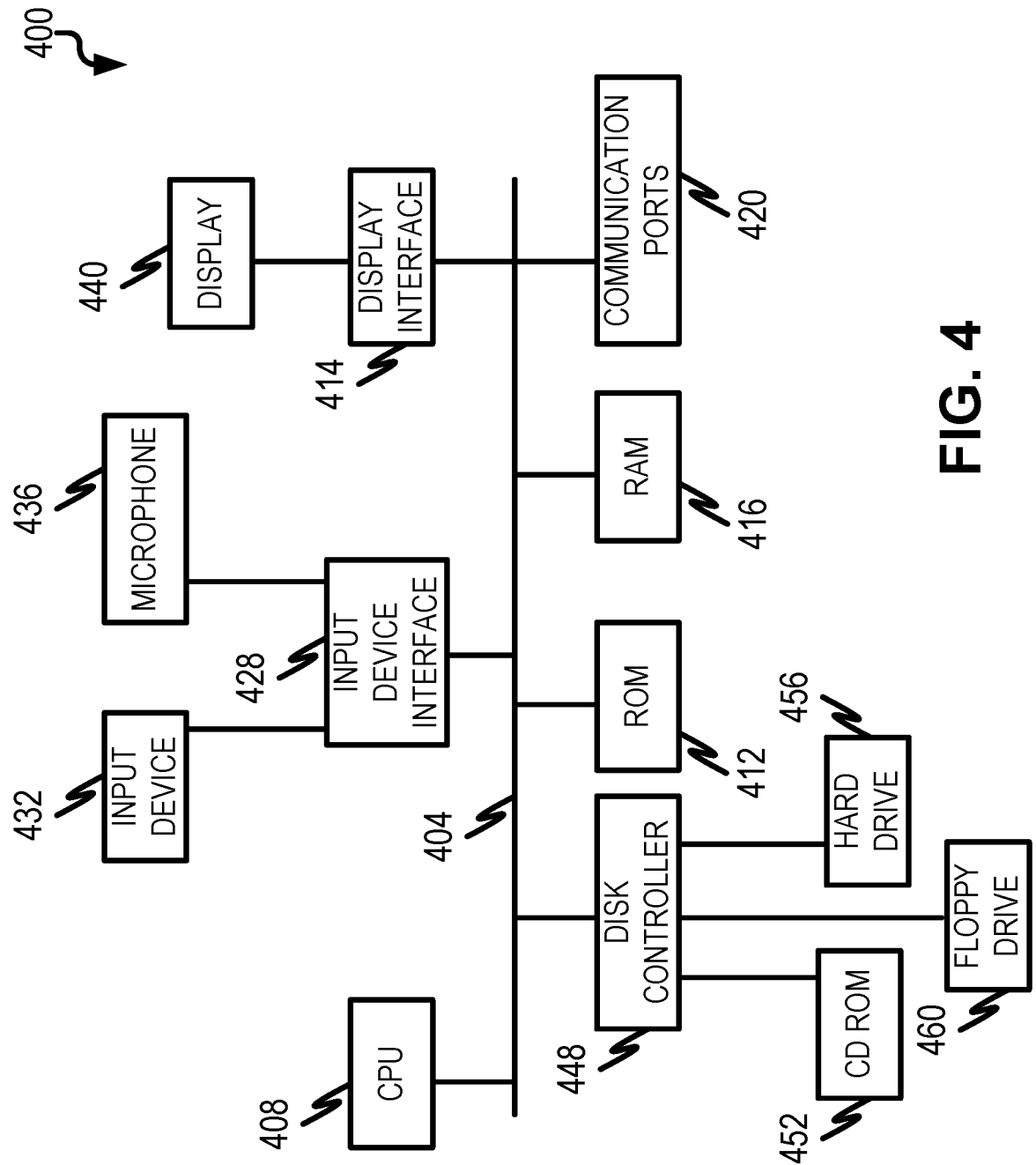
FIG. 4 is a schematic diagram illustrating a computing device for implementing aspects described herein.

FIG. 4 is a diagram illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 to the user and an input device 432 such as keyboard and/or a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. The input device 432 and the microphone 436 can be coupled to and convey information via the bus 404 by way of an input device interface 428. Other computing devices, such as dedicated servers, can omit one or more of the display 440 and display interface 424, the input device 432, the microphone 436, and input device interface 428.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:

initiating, by a software application executing on a primary server, a user authentication process prompting a user to enter, via a graphical user interface, login credentials;

determining that the login credentials have been flagged;

injecting, in response to the determining, tracking cookies on a computing device used by the user;

creating, using information obtained from the injected tracking cookies, a virtual profile of the user, the virtual profile comprising a list of password trials per website, timestamps for password trials, and an origin of at least one stolen password;

directing the user from the primary server to a fake server mimicking the software application executing on the primary server;

obtaining, by the fake server and based on the virtual profile, metadata associated with the user interacting with the fake server that characterizes the user, the metadata comprising a browser fingerprint;

providing data comprising the obtained metadata;

generating an alert using the obtained metadata that (i) characterizes the user including the browser fingerprint and (ii) warns the user that access to the software application is unauthorized; and causing the alert to be displayed in the graphical user interface for viewing by the user.

2. The method of claim 1, wherein the providing data comprises at least one of:

loading the data into memory, transmitting the data to a remote computing system, or storing the data in physical persistence.

3. The method of claim 1 further comprising:

identifying an Internet Protocol (IP) address for the user; and blacklisting the IP address from subsequent access to the software system.

4. The method of claim 1 further comprising:

initiating an account password recovery process requiring multi-factor authentication;

prompting, in the graphical user interface, the user to provide an e-mail address and/or phone number required for the multi-factor authentication, the provided e-mail address and/or phone number forming part of the obtained metadata.

5. The method of claim 4, wherein the provided e-mail address and/or phone number is used to deliver a warning message to the user indicating to the user that its activities are unauthorized.

6. The method of claim 1, wherein the obtained metadata further comprises at least one of: an IP address, a VPN provider and address if used, Internet Service Provider, IP address geolocation.

7. The method of claim 1, wherein the browser fingerprint characterizes at least one of a user agent, a list of installed plugins, a language, a screen size of a computing device, and/or an operating system being executed on the computing device.

8. The method of claim 1 further comprising:

scanning an IP address of a computing device used by the user to detect open ports; and detecting, using the detected open ports, applications running on the device.

9. A system comprising:

at least one data processor; and memory storing instructions which, when executed by the at least one data processor, result in operations comprising:

initiating, by a software application executing on a primary server, a user authentication process prompting a user to enter, via a graphical user interface, login credentials;

determining that the login credentials have been flagged;

injecting, in response to the determining, tracking cookies on a computing device used by the user;

creating, using information obtained from the injected tracking cookies, a virtual profile of the user, the virtual profile comprising a list of password trials per website, timestamps for password trials, and an origin of at least one stolen password;

directing the user from the primary server to a fake server mimicking the software application executing on the primary server;

initiating an account password recovery process requiring multi-factor authentication;

prompting, in the graphical user interface, the user to provide an e-mail address and/or phone number required for the multi-factor authentication, the provided e-mail address and/or phone number forming part of the obtained metadata;

obtaining, by the fake server and based on the virtual profile, metadata associated with the user interacting with the fake server that characterizes the user including the e-mail address and/or phone number provided by the user in response to the prompting; and providing data comprising the obtained metadata.

10. The system of claim 9, wherein the providing data comprises:

generating an alert using the obtained metadata that characterizes the user; and causing the alert to be displayed in the graphical user interface.

11. The system of claim 9, wherein the providing data comprises at least one of:

loading the data into memory, transmitting the data to a remote computing system, or storing the data in physical persistence.

12. The system of claim 9, wherein the operations further comprise:

identifying an Internet Protocol (IP) address for the user; and blacklisting the IP address from subsequent access to the software system.

13. The system of claim 9, wherein the provided e-mail address and/or phone number is used to deliver a warning message to the user indicating to the user that its activities are unauthorized.

14. The system of claim 9, wherein the obtained metadata comprises at least one of: an IP address, athc browser fingerprint, a VPN provider and address if used, Internet Service Provider, IP address geolocation.

15. The system of claim 14, wherein the browser fingerprint characterizes at least one of a user agent, a list of installed plugins, a language, a screen size of a computing device, and/or an operating system being executed on the computing device.

16. The system of claim 9, wherein the operations further comprise:

scanning an IP address of a computing device used by the user to detect open ports; and detecting, using the detected open ports, applications running on the device.

17. A non-transitory computer program product storing instructions which, when executed by at least one data processor forming part of at least one computing device, result in operations comprising:

initiating, by a software application executing on a primary server, a user authentication process prompting a user to enter, via a graphical user interface, login credentials;

determining that the login credentials have been flagged;

injecting, in response to the determining, tracking cookies on a computing device used by the user;

creating, using information obtained from the injected tracking cookies, a virtual profile of the user, the virtual profile comprising a list of password trials per website, timestamps for password trials, and an origin of at least one stolen password;

directing the user from the primary server to a fake server mimicking the software application executing on the primary server;

obtaining, by the fake server and based on the virtual profile, metadata associated with the user interacting with the fake server that characterizes the user; and providing data comprising the obtained metadata.

18. The non-transitory computer program product of claim 17, wherein the operations further comprise:

identifying an Internet Protocol (IP) address for the user; and blacklisting the IP address from subsequent access to the software system.

19. The non-transitory computer program product of claim 17, wherein the operations further comprise:

initiating an account password recovery process requiring multi-factor authentication;

prompting, in the graphical user interface, the user to provide an e-mail address and/or phone number required for the multi-factor authentication, the provided e-mail address and/or phone number forming part of the obtained metadata.

20. The non-transitory computer program product of claim 17, wherein the obtained metadata comprises a browser fingerprint that characterizes at least one of a user agent, a list of installed plugins, a language, a screen size of a computing device, and/or an operating system being executed on the computing device.

* * * * *